United States Patent [19]
Ha

[11] Patent Number: 5,995,340
[45] Date of Patent: Nov. 30, 1999

[54] MAGNETIC HEAD FOR VECTOR RECORDING/PLAY

[75] Inventor: Chung-hun Ha, Seoul, Rep. of Korea

[73] Assignee: Samsung Electronics Co., Ltd., Suwon, Rep. of Korea

[21] Appl. No.: 08/958,194

[22] Filed: Oct. 27, 1997

[30] Foreign Application Priority Data

Oct. 31, 1996 [KR] Rep. of Korea ............. 96-51846

[51] Int. Cl.⁶ ............................................. G11B 5/187
[52] U.S. Cl. ..................................... 360/121; 360/125
[58] Field of Search .......................... 360/118, 125, 360/119, 121, 126, 66, 127; 361/151

[56] References Cited

U.S. PATENT DOCUMENTS

| | | |
|---|---|---|
| 4,423,460 | 12/1983 | Jackson et al. ............... 361/151 |
| 4,769,728 | 9/1988 | Toyoshima et al. ........... 360/118 |
| 4,896,220 | 1/1990 | Sato et al. ..................... 360/21 |
| 5,059,278 | 10/1991 | Cohen et al. .................. 360/123 |
| 5,130,876 | 7/1992 | Gooch ............................ 360/115 |
| 5,495,379 | 2/1996 | McNeil et al. ................. 360/125 |
| 5,666,250 | 9/1997 | Stageberg et al. ............. 360/126 |

*Primary Examiner*—Jefferson Evans
*Attorney, Agent, or Firm*—Burns, Doane, Swecker & Mathis, L.L.P.

[57] ABSTRACT

A magnetic head for vector recording/playing capable of recording in multiple directions to increase recording density. In the magnetic head according to the present invention, a body is formed to have four poles, each of which is wound with a coil. Accordingly, 3-bit data, in which magnetic domains are arranged in eight directions may be recorded/reproduced, to thereby record a large amount information in one recording area of the track, and reduce the data transfer rate.

13 Claims, 5 Drawing Sheets

MAGNETIC HEAD FOR VECTOR RECORDING/PLAY

BACKGROUND OF THE INVENTION

The present invention relates to a magnetic head for vector recording/playing of a hard disk drive or a floppy disk drive, and more particularly, to a magnetic head for vectorially recording/playing capable of recording in multiple directions to increase recording density.

FIG. 1 is a perspective view of a conventional magnetic head for recording/playing. As shown in FIG. 1, the conventional magnetic head is formed by winding a wire around a tetragonal or cylindrical body 11 to form coils 12, so that a magnetic recording direction 14 is bidirectional 15 and parallel to a track 13. Therefore, only 1 bit is recorded on one recording area, to thereby reduce the recording efficiency ratio (bits/area), and data is processed bit by bit during recording/playing of data, to thereby increase access time, which is obtained by adding the read time to the data transfer time (i.e., access time=read time+data transfer time).

SUMMARY OF THE INVENTION

To solve the problems, it is an object of the present invention to provide a magnetic head for vectorially recording/playing capable of recording in multiple directions on each recording area of a track to increase recording density.

To accomplish the above object of the present invention, there is provided a magnetic head for vectorially recording/playing including a body having magnetic poles for generating magnetic flux in two or more directions; and coils for supplying current to form magnetic flux on the magnetic poles.

Preferably, there are four poles.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
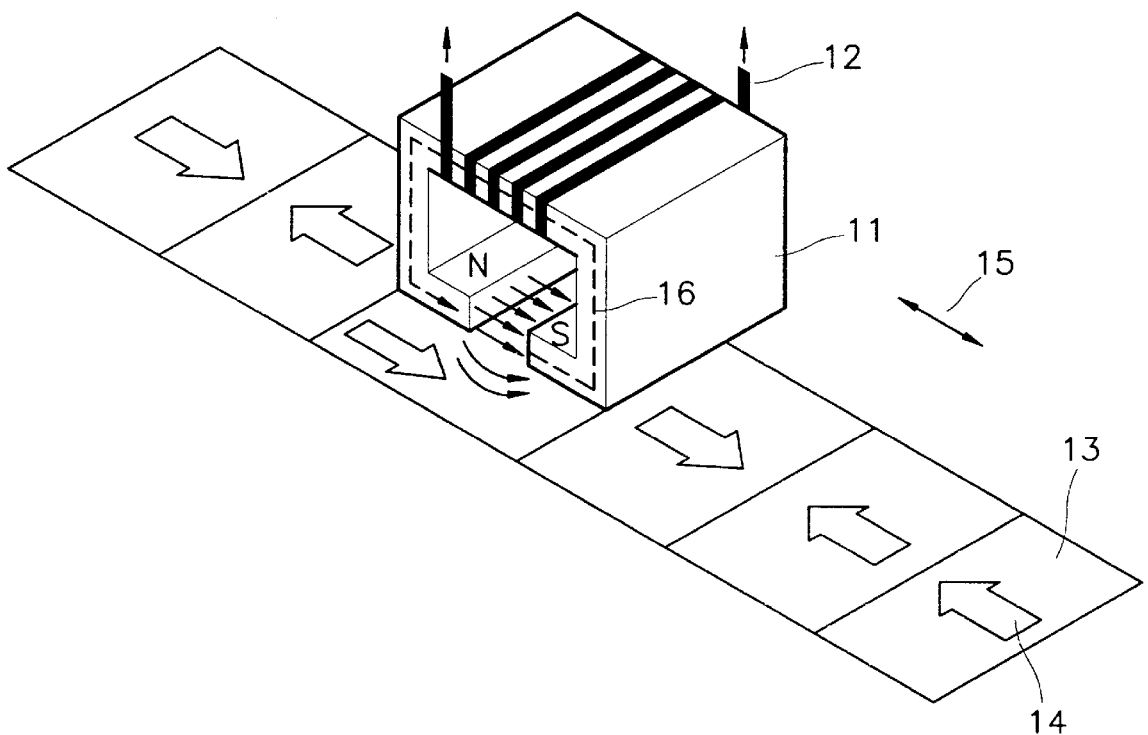
FIG. 1 is a perspective view of a conventional magnetic head for recording/playing.
Figure 2:
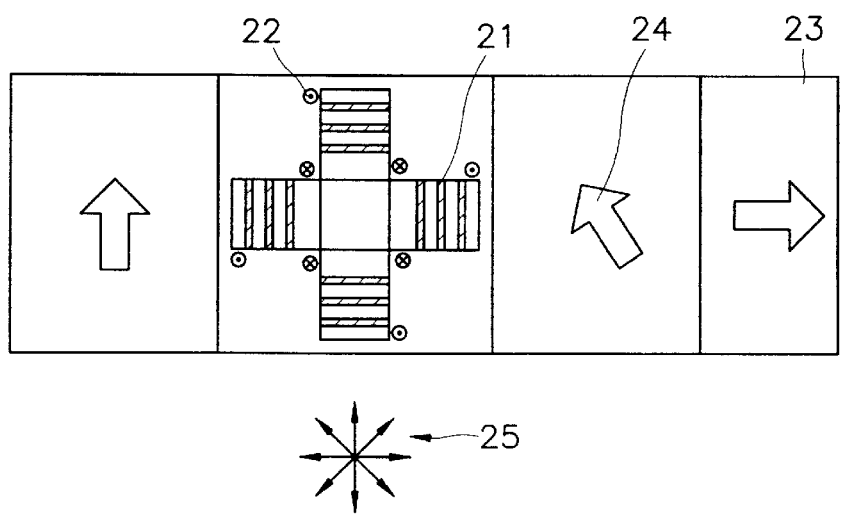
FIG. 2 is a plan view of a magnetic head for recording/playing according to an embodiment of the present invention.
Figure 3:
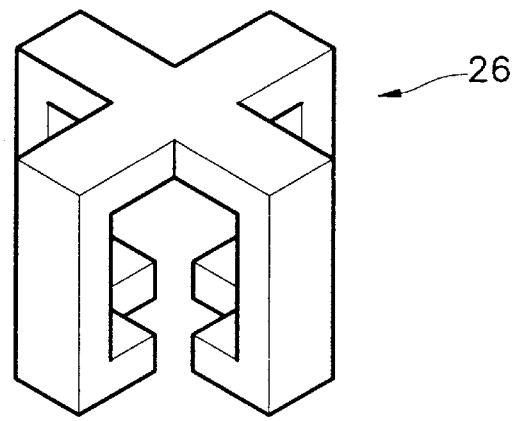
FIG. 3 is a perspective view of the body of a magnetic head for recording/playing according to the present invention.
Figure 4A:
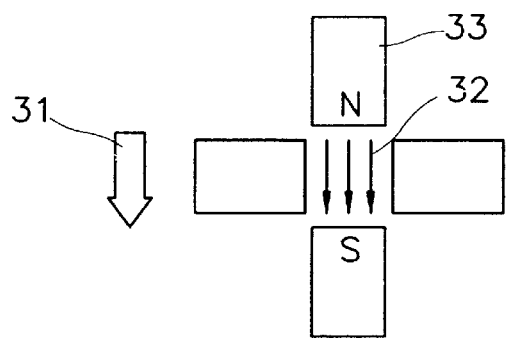
FIGS. 4A through 4H are for illustrating the operating principle of a magnetic head for recording/playing.
Figure 4B:
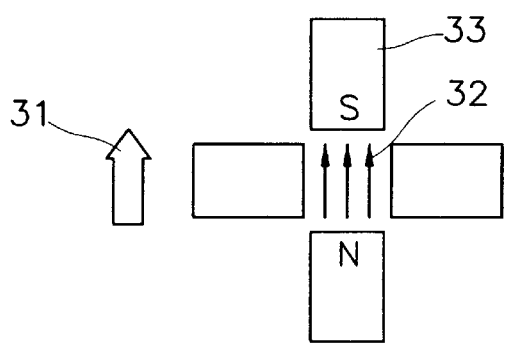
Figure 4C:
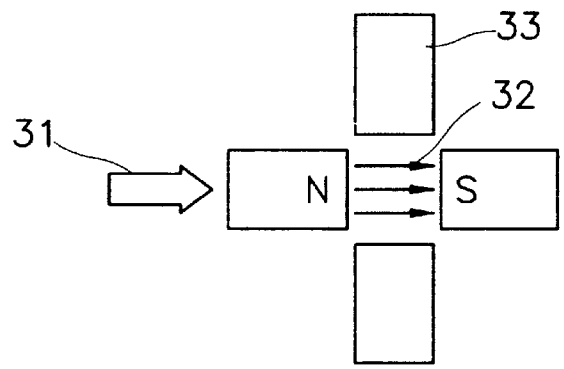
Figure 4D:
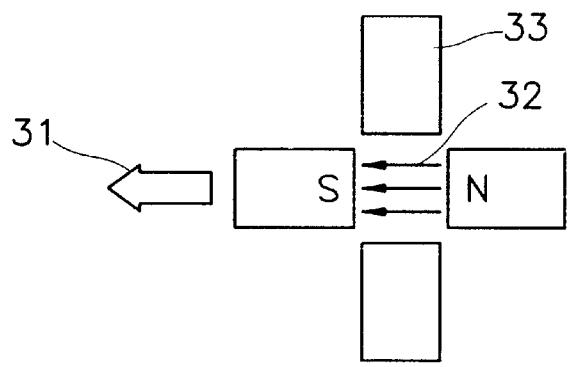
Figure 4E:
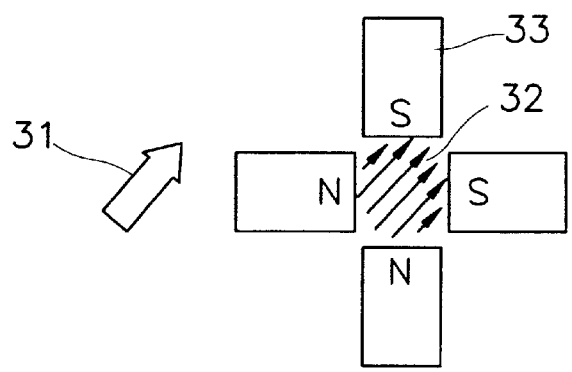
Figure 4F:
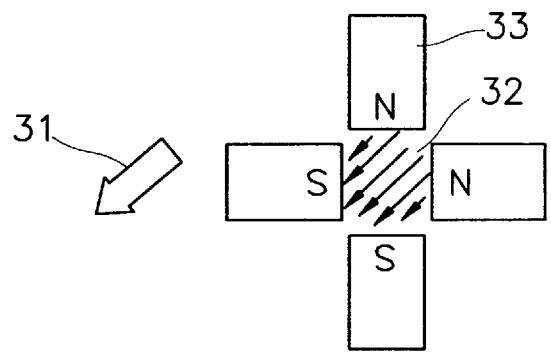
Figure 4G:
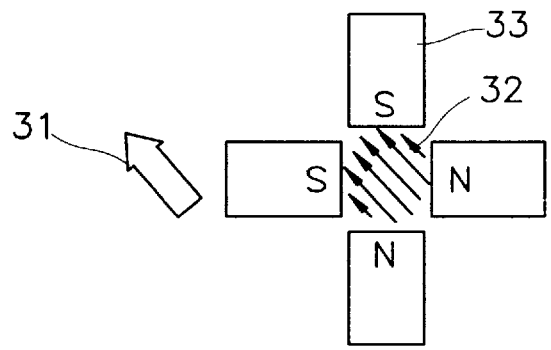
Figure 4H:
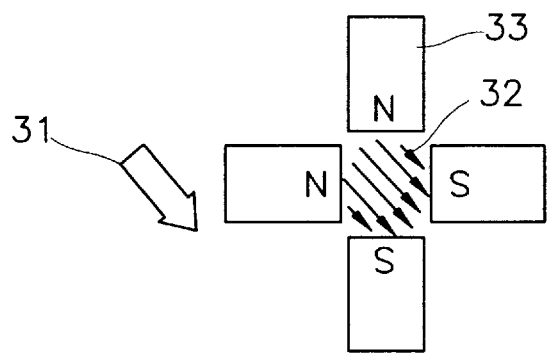

Referring to FIGS. 2 and 3, a body of a magnetic head 21 for recording/playing according to the present invention has a cruciform shape, in which each of four bars is bent inward in a C-shape making the magnetic head 21 quadrupolar and the center portion is empty. A wire is wound around each of the bars to form coils 22. Accordingly, a magnetic recording direction 24 recorded on a track 24 includes 8 directions 25. The 8 directions, as shown in FIGS. 4A through 4H, are determined by the polarity of the cruciform-shaped magnetic head 21, and polarity of the magnetic head 21 is determined by the direction of current applied to coils 22.

That is, as shown in FIG. 2, when current is applied to the coils 22 of each bar, as shown FIGS. 4A through 4H, each bar has a N or S polarity. At this time, a magnetic flux is generated towards the N or S pole to arrange magnetic domains distributed on a track surface. This is a write (record) operation. The direction of the arranged magnetic domains is fixed. Accordingly, when a head passes over the magnetic domains, current flows in the coil due to the magnetic flux of the magnetic domains. Thus, the direction of the current is detected to read data. This is a read (play) operation.

A conventional recording/playing principle and physical law that magnetic flux form a shortest path are adapted to the above operations. Therefore, as shown in FIGS. 4A through 4H, the quadrupole magnetic head forms 8 magnetic flux directions, which makes 8 directions of the magnetic domains recorded on the track. The conventional bipolar magnetic head records/plays only data of 0 or 1, i.e., 1-bit data, however, the quadrupole magnetic head according to the present invention records/plays, 3-bit data, which is capable of vectorially recording/playing.

Figure 5:
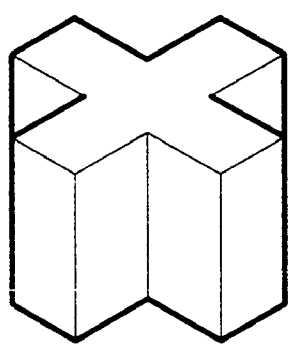
FIG. 5 is a plan view of a magnetic head for recording/playing according to another embodiment of the present invention.
Figure 5:
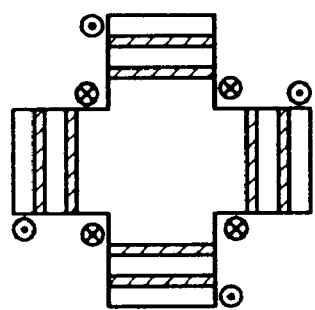
Figure 5:
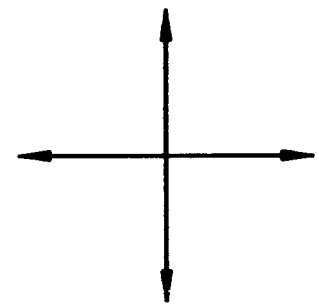

FIG. 5 shows another embodiment of the present invention, in which the center of the body is a quadrupolar magnetic head connected in the '+' form, which makes 4 directions of magnetic flux. Accordingly, 2-bit data may be recorded/played.

As described above, in the magnetic head according to the present invention, the body has cruciform shape with each bar being wound by a wire to form a coil. Accordingly, 3-bit data in which magnetic domains are arranged in 8 directions may be recorded/played, to thereby record large amount information in one recording area of the track, and reduce the data transfer time.

What is claimed is:

1. A magnetic head for vector recording/playing, comprising:

a body having poles for generating magnetic flux in more than two directions;

coils to form magnetic flux on the poles wherein each of said poles has a coil wound therearound; and means for applying current to said individual coils for generating magnetic flux in more than two directions wherein at least one of said directions orthogonal to a recording track and at least one other direction is non-orthogonal to said recording track.

2. The magnetic head for vector recording/playing of claim 1, wherein the body comprises four poles.

3. The magnetic head for vector recording/playing of claim 2, wherein the four poles are formed by a body having a cruciform shape.

4. The magnetic head for vector recording/playing of claim 3, wherein the bars of the four poles are bent inward in a C-shape.

5. A magnetic head for vector recording/playing, comprising:

a body having poles for generating magnetic flux in at least two non-parallel directions;

coils to form magnetic flux on the poles wherein each of said poles has a coil wound therearound; and means for applying current to said individual coils for generating magnetic flux in the least two directions wherein one of said directions is orthogonal to a recording track and wherein at least one other of said directions is non-orthogonal to said track.

6. The magnetic head for vector recording/playing of claim 5, wherein the body comprises four poles.

7. The magnetic head for vector recording/playing of claim 6, wherein the four poles are formed by a body having a cruciform shape.

8. The magnetic head for vector recording/playing of claim 7, wherein the bars of the four poles are bent inward in a C-shape.

9. The magnetic head for vector recording/playing of claim 5, wherein said body generates magnetic flux in four vector directions.

10. The magnetic head for vector recording/playing of claim 5, wherein said body generates magnetic flux in eight vector directions.

11. A method of vector recording/playing, comprising:

providing a magnetic head body having poles around which are wound separate coils;

separately applying current to each of said coils to generate flux in at least two directions, at least one of which is non-orthogonal to a recording track of a magnetic recording medium and at least one other of which is orthogonal to said recording track; and vectorially recording/playing information on said recording track of said magnetic recording medium.

12. A method according to claim 11, wherein said step of separately applying current to each of said coils includes generating flux in more than four directions.

13. A method according to claim 12, wherein flux is generated in eight directions.

* * * * *